(12) United States Patent
Zhang et al.

(10) Patent No.: US 9,298,496 B2
(45) Date of Patent: Mar. 29, 2016

(54) DATA PROCESSING DEVICE, OPERATION MODE SWITCHING METHOD AND DATA DISPLAYING METHOD THEREOF

(71) Applicants: LENOVO (BEIJING) LIMITED, Beijing (CN); BEIJING LENOVO SOFTWARE LTD., Beijing (CN)

(72) Inventors: Yongqiang Zhang, Beijing (CN); Jun Li, Beijing (CN); Lu Lu, Beijing (CN); Chentao Yu, Beijing (CN); Shuangxi Huang, Beijing (CN)

(73) Assignees: Beijing Lenovo Software Ltd., Beijing (CN); Lenovo (Beijing) Limited, Beijing (CN)

(*) Notice: Subject to any disclaimer, the term of this patent is extended or adjusted under 35 U.S.C. 154(b) by 152 days.

(21) Appl. No.: 14/348,250

(22) PCT Filed: Oct. 31, 2012

(86) PCT No.: PCT/CN2012/083850
§ 371 (c)(1),
(2) Date: Mar. 28, 2014

(87) PCT Pub. No.: WO2013/064073
PCT Pub. Date: May 10, 2013

(65) Prior Publication Data
US 2014/0229728 A1 Aug. 14, 2014

(30) Foreign Application Priority Data
Nov. 2, 2011 (CN) .......................... 2011 1 0341920
Nov. 2, 2011 (CN) .......................... 2011 1 0342295

(51) Int. Cl.
*G06F 9/48* (2006.01)
*G06F 3/14* (2006.01)
*G06F 3/01* (2006.01)

(52) U.S. Cl.
CPC .. *G06F 9/48* (2013.01); *G06F 3/01* (2013.01); *G06F 3/14* (2013.01); *G09G 2320/0261* (2013.01); *G09G 2354/00* (2013.01); *G09G 2358/00* (2013.01)

(58) Field of Classification Search
CPC ............... G06F 3/14; G06F 9/48; G06F 3/01; G09G 2358/00; G09G 2320/0261; G09G 2354/00
See application file for complete search history.

(56) References Cited

U.S. PATENT DOCUMENTS

| 2010/0245209 A1* | 9/2010 | Miller | G06F 1/1618 345/1.3 |
| 2012/0081270 A1* | 4/2012 | Gimpl | G06F 1/1616 345/1.3 |

FOREIGN PATENT DOCUMENTS

| CN | 201654982 U | 11/2010 |
| CN | 101984648 A | 3/2011 |
| CN | 102221958 A | 10/2011 |

OTHER PUBLICATIONS

International Search Report from corresponding International Application No. PCT/CN2012/083850, mailed Jan. 31, 2013.

*Primary Examiner* — Shaheda Abdin
(74) *Attorney, Agent, or Firm* — Westman, Champlin & Koehler, P.A.

(57) ABSTRACT

In a method for switching an operation mode of a data processing device, a switching instruction is obtained; and the data processing device is switched to a first operation mode or a second operation mode based on the switching instruction. The second operation mode is a multi-user operation mode.

12 Claims, 12 Drawing Sheets

DATA PROCESSING DEVICE, OPERATION MODE SWITCHING METHOD AND DATA DISPLAYING METHOD THEREOF

CROSS-REFERENCE TO RELATED APPLICATION

This application is a Section 371 National Stage Application of International Application No. PCT/CN2012/083850, filed Oct. 31, 2012 and published as WO 2013/064073 A1 on May 10, 2013, in Chinese, the contents of which are hereby incorporated by reference in their entirety.

FIELD

The present application relates to the field of computer technology, and in particular, to a data processing device, an operation mode switching method and a data displaying method thereof.

BACKGROUND

Conventionally, a data processing device, such as an AIO (All In One), a notebook computer and the like, is still a "personal" computer, where during a running process of an application, only one person is allowed to perform operations at a time. If more people want to join in and accomplish one application together, there are now two basic approaches including a sequential approach and a networking approach.

In the sequential approach, the second person operates after the first person completes his or her operation, and the third person operates after the second person completes his or her operation, and so on. This approach does not allow two or more persons simultaneously operate the same application.

In the networking approach, multiple data processing devices are networked, and each user may operate the same application through one of the data processing devices. This approach increases hardware cost, and each participant cannot communication in a face-to-face manner.

In addition, the conventional data processing device cannot satisfy the requirement that multiple users operate different applications at the same time. When multiple users want to conduct their operations respectively on the same data processing device, they can use the data processing device only one after another, instead of using one data processing device at the same time. It is thus necessary to provide each user with one data processing device, thereby increasing cost.

In addition, when multiple users view content displayed on a display of a data processing device from different angles, the displayed content can be directly seen from only one of the angles. The other users can see the content only from side positions, or see a 180-degree reversed content. So, it is not convenient for multiple users to view at the same time.

In the networking approach, a dominant scenario for multiple users to use a computer is playing a game, such as mahjong, Texas Poker, and the other card games, by multiple players on the same display screen. Such a game always relates to privacy issues of players. Based on a game rule, a player can only see his or her own cards, and cards in a public area can be seen by all players. In order to play such a game on a computer, it is necessary to address privacy issues of players when the players play the game together.

A conventional solution, Solution 1, for solving the above problem is that a player may shield his or her own cards by his or her hand, to protect privacy.

This solution has disadvantages in that a touch by the hand may affect use of a multi-touch scheme, and that a shielding area by the hand is limited, and thus such shielding may be ineffective.

Another conventional solution, Solution 2, for solving the above problem is to use other physical shielding to protect a player's own cards or information which is intended to be seen only by the player.

This solution has disadvantages in that it may bring more burden and complexity to users in playing game on the computer, and the physical shielding may affect a player showing cards or performing other touch operations over multiple display areas.

SUMMARY

The present disclosure provides a data processing device, an operation mode switching method and a data displaying method thereof, which can solve the problems that at least two users cannot simultaneously operate different applications with one data processing device, and at least three users cannot simultaneously operate one application with a single data processing device, and also effectively protect privacy of multiple users using a single-screen multi-user terminal.

An aspect of the present disclosure provides a method for switching an operation mode of a data processing device having a screen supporting a multi-touch control function, characterized in that, the method comprises: obtaining a switching instruction; and switching the data processing device to a first operation mode or a second operation mode based on the switching instruction, wherein the second operation mode is different from the first operation mode, and the second operation mode is a mode where at least two users simultaneously operate different applications or a mode where at least three users simultaneously operate the same application, the same application supporting the at least three users' simultaneous operations.

Preferably, said obtaining the switching instruction comprises: detecting whether a value of an angle between the data processing device and a plane in which the data processing device is placed is adjusted from a first angle value to a second angle value; judging whether an operation mode corresponding to the second angle value is the same as an operation mode corresponding to the first angle value; and generating the switching instruction when the operation mode corresponding to the second angle value is different from the operation mode corresponding to the first angle value.

Preferably, the first operation mode is an operation mode where the angle between the data processing device and the plane in which the data processing device is placed is within a first angle range, and the second operation mode is an operation mode where the angle between the data processing device and the plane in which the data processing device is placed is within a second angle range.

Preferably, the data processing device further comprises a third operation mode where the angle between the data processing device and the plane in which the data processing device is placed is within a third angle range, wherein any angle value within the first angle range is larger than any angle value within the third angle range, and any angle value within the third angle range is larger than any angle value within the second angle range.

Preferably, said obtaining the switching instruction comprises: generating the switching instruction based on an operation by a user on the screen or a mechanical key on the data processing device.

An aspect of the present disclosure provides a method for switching an operation mode of a data processing device, wherein the data processing device has a screen supporting a multi-touch control function, and the operation mode of the data processing device comprises: a first operation mode where an angle between the data processing device and a plane in which the data processing device is placed is within a first angle range; and a second operation mode where the angle between the data processing device and the plane in which the data processing device is placed is within a second angle range, wherein the second operation mode is different from the first operation mode, and the second operation mode is a mode where at least two users simultaneously operate different applications or a mode where at least three users simultaneously operate the same application, the same application supporting at least three users' simultaneous operations, and wherein any angle value within the first angle range is larger than any angle value within the second angle range, the method comprises:

detecting whether a value of the angle between the data processing device and the plane in which the data processing device is placed is adjusted from a first angle value to a second angle value;

judging whether an operation mode corresponding to the second angle value is the same as an operation mode corresponding to the first angle value, when value of the angle between the data processing device and the plane in which the data processing device is placed is adjusted from the first angle value to the second angle value;

generating a switching instruction for switching the operation mode when the operation mode corresponding to the second angle value is different from the operation mode corresponding to the first angle value; and switching the operation mode of the data processing device from the operation mode corresponding to the first angle value to the operation mode corresponding to the second angle value based on the switching instruction, wherein the operation mode corresponding to the second angle value is the first operation mode or the second operation mode.

Preferably, the data processing device further comprises a third operation mode, where the angle between the data processing device and the plane in which the data processing device is placed is within a third angle range, wherein any angle value within the first angle range is larger than any angle value within the third angle range, any angle value within the third angle range is larger than any angle value within the second angle range, and the operation mode corresponding to the second angle value is the first operation mode, the second operation mode, or the third operation mode.

An aspect of the present disclosure provides a method for switching an operation mode of a data processing device having a screen supporting a multi-touch control function, characterized in that, the method comprises: obtaining a switching instruction; and switching the data processing device to a first operation mode or a second operation mode based on the switching instruction, wherein the second operation mode is different from the first operation mode, and in the second operation mode, the screen has at least two display areas, and a display direction in which content is displayed in the at least two display areas is changed under control of a display direction control instruction generated by the data processing device.

Preferably, a first display area of the at least two display areas has a first display content, a second display area of the at least two display areas has a second display content, and a display direction of the first display content is different from that of the second display content.

An aspect of the present disclosure provides method for switching an operation mode of a data processing device having a screen supporting a multi-touch control function, wherein the operation mode of the data processing device comprises: a first operation mode where an angle between the data processing device and a plane in which the data processing device is placed is within a first angle range; and a second operation mode where the angle between the data processing device and a plane in which the data processing device is placed is within a second angle range, wherein the second operation mode is different from the first operation mode, in the second operation mode, the screen has at least two display areas, and a display direction in which content is displayed in the at least two display areas is changed under control of a display direction control instruction generated by the data processing device, and wherein any angle value within the first angle range is larger than any angle value within the second angle range, the method comprises:

detecting whether a value of the angle between the data processing device and the plane in which the data processing device is placed is adjusted from a first angle value to a second angle value;

judging whether an operation mode corresponding to the second angle value is the same as an operation mode corresponding to the first angle value, when the value of the angle between the data processing device and the plane in which the data processing device is placed is adjusted from the first angle value to the second angle value;

generating a switching instruction for switching the operation mode when the operation mode corresponding to the second angle value is different from the operation mode corresponding to the first angle value; and switching the operation mode of the data processing device from the operation mode corresponding to the first angle value to the operation mode corresponding to the second angle value based on the switching instruction, wherein the operation mode corresponding to the second angle value is the first operation mode or the second operation mode.

Preferably, a first display area of the at least two display areas has a first display content, a second display area of the at least two display areas has a second display content, and a display direction of the first display content is different from that of the second display content.

Another aspect of the present disclosure provides a data processing device, wherein an operation mode of the data processing device comprises: a first operation mode where an angle between the data processing device and a plane in which the data processing device is placed is within a first angle range; and a second operation mode where the angle between the data processing device and the plane in which the data processing device is placed is within a second angle range, wherein the second operation mode is different from the first operation mode, and the second operation mode is an operation mode where at least two users simultaneously operate different applications or a mode where at least three users simultaneously operate the same application, the same application supporting the at least three users' simultaneous operations, and wherein any angle value within the first angle range is larger than any angle value within the second angle range, the data processing device comprises:

a display comprising a screen having a multi-touch control function, and a case for accommodating and fixing the screen, the case having a back surface;

an angle adjustment structure comprising a rotating structure arranged on the back surface, and a supporting structure one end of which is connected to the rotating structure, wherein the supporting structure cooperates with the rotating structure so that an angle between the data processing device and a plane in which the data processing device is placed can be changed;

an angle detector configured to detect whether a value of the angle between the data processing device and the plane in which the data processing device is placed is adjusted from a first angle value to a second angle value;

a main board arranged in the case;

a first processing chip arranged on the main board and configured to judge whether an operation mode corresponding to the second angle value is the same as an operation mode corresponding to the first angle value, when the value of the angle between the data processing device and the plane in which the data processing device is placed is adjusted from the first angle value to the second angle value;

a second processing chip arranged on the main board and configured to generate a switching instruction for switching the operation mode when the operation mode corresponding to the second angle value is different from the operation mode corresponding to the first angle value; and a third processing chip arranged on the main board and configured to switch the operation mode of the data processing device from the operation mode corresponding to the first angle value to the operation mode corresponding to the second angle value based on the switching instruction, wherein the operation mode corresponding to the second angle value is the first operation mode or the second operation mode, wherein the first processing chip, the second processing chip, and the third processing chip are the same chip, or individual chips separately arranged on the main board.

Preferably, the supporting structure cooperates with the rotating structure so that the data processing device keeps in a fixed state at any angle.

Preferably, the data processing device further comprises a third operation mode, where the angle between the data processing device and the plane in which the data processing device is placed is within a third angle range, wherein any angle value within the first angle range is larger than any angle value within the third angle range, any angle value within the third angle range is larger than any angle value within the second angle range, and the operation mode corresponding to the second angle value is the first operation mode, the second operation mode, or the third operation mode.

Another aspect of the present disclosure provides data processing device, wherein an operation mode of the data processing device comprises: a first operation mode where an angle between the data processing device and a plane in which the data processing device is placed is within a first angle range; and a second operation mode where the angle between the data processing device and a plane in which the data processing device is placed is within a second angle range, wherein the second operation mode is different from the first operation mode, and wherein any angle value within the first angle range is larger than any angle value within the second angle range, the data processing device comprises:

a display comprising a screen having a multi-touch control function, and a case for accommodating and fixing the screen, the case having a back surface, wherein in the second operation mode, the screen has at least two display areas;

an angle adjustment structure comprising a rotating structure arranged on the back surface, and a supporting structure one end of which is connected to the rotating structure, wherein the supporting structure cooperates with the rotating structure so that an angle between the data processing device and a plane in which the data processing device is placed can be changed;

an angle detector configured to detect whether a value of the angle between the data processing device and the plane in which the data processing device is placed is adjusted from a first angle value to a second angle value;

a main board arranged in the case;

a first processing chip arranged on the main board and configured to judge whether an operation mode corresponding to the second angle value is the same as an operation mode corresponding to the first angle value, when the value of the angle between the data processing device and the plane in which the data processing device is placed is adjusted from the first angle value to the second angle value;

a second processing chip arranged on the main board and configured to generate a switching instruction for switching the operation mode when the operation mode corresponding to the second angle value is different from the operation mode corresponding to the first angle value;

a third processing chip arranged on the main board and configured to switch the operation mode of the data processing device from the operation mode corresponding to the first angle value to the operation mode corresponding to the second angle value based on the switching instruction, wherein the operation mode corresponding to the second angle value is the first operation mode or the second operation mode; and a fourth processing chip arranged on the main board and configured to generate a display direction control instruction when the data processing device operates in the second operation mode, wherein the display direction control instruction is used to control a change of a display direction in which content is displayed in the at least two display areas, wherein the first processing chip, the second processing chip, the third processing chip, and the fourth processing chip are the same chip, or individual chips separately arranged on the main board.

Preferably, a first display area of the at least two display areas has a first display content, a second display area of the at least two display areas has a second display content, and a display direction of the first display content is different from that of the second display content.

The above embodiments of the present disclosure switch one data processing device among different operation modes, so that the data processing device may serve as either a personal computer or a computer shared by family members. That is, the data processing device may be operated by either one person or multiple persons at the same time. In the latter case, at least two users may simultaneously operate different applications, or at least three users may simultaneously operate one application, thereby reducing hardware cost and facilitating face-to-face communication among the users.

Furthermore, according to an embodiment of the present disclosure, the second operation mode may allow multiple users to simultaneously see directly a content displayed on the screen from different angles. It is thus more user-friendly and convenient.

Furthermore, according to an embodiment of the present disclosure, the operation mode of the data processing device is associated with an angle between the data processing device and a plane in which the data processing device is placed. When the angle is large, for example, 75 degree, the operation mode is the first operation mode, that is, a single-person operation mode. When the angle is 0 degree, the operation mode is the second operation mode. At this time, the data processing device is laid flat on a horizontal plane, and it is suitable for a multi-person operation mode. Therefore, such human-engineering mode switching design is more convenient.

A further aspect of the present disclosure provides a data displaying method, comprising:

when users of at least two terminals simultaneously use a single-screen multi-user service provided by a data processing device, establishing connection between the data processing device and the at least two terminals, and receiving first data transmitted by a first terminal based on a data sharing rule between the at least two terminals;

combining the first data with stored shared data to obtain combined data; and displaying a specified part of the combined data on a display screen of the data processing device.

Further, said establishing connection between the data processing device and the at least two terminals comprises:

receiving a connection request from the first terminal of the at least two terminals, and connecting the first terminal to the data processing device based on the connection request; or the data processing device searching for one or more of the at least two terminals which are accessible, and selecting a set number of terminals for access based on connection statuses of connected terminals.

Said connecting the first terminal to the data processing device based on the connection request comprises:

judging whether the number of connected terminals reaches a preset threshold, and if not, accessing the first terminal based on the connection request.

After connecting the first terminal to the data processing device based on the connection request, the method further comprises:

when the first data has not been received from the first terminal within a preset time period, disconnecting the connection with the first terminal and displaying disconnection information corresponding to the first terminal on the display screen.

Said combining the first data with stored shared data to obtain combined data comprises:

replacing, with the received first data, the shared data of the at least two terminals which has been stored before receiving the first data.

Said combining the first data with stored shared data to obtain combined data comprises:

obtaining stored shared data which is received before receiving the first data and corresponds to the first terminal; and combining the first data with the stored shared data to obtain the combined data.

Said displaying the specified part of the combined data on the display screen comprises:

displaying the specified part of the combined data on a first display area corresponding to the first terminal on the display screen.

The combined data comprises at least one picture, and said displaying the specified part of the combined data on a first display area corresponding to the first terminal on the display screen comprises:

displaying each picture of the at least one picture completely on the first display area; or overlapping pictures corresponding to the first data stored by the first terminal, and displaying pictures corresponding to the first data in a top layer on the first display area.

Said combining the first data with stored shared data to obtain combined data comprises:

obtaining stored shared data of the at least two terminals after receiving the first data; and combining the first data with the stored shared data to obtain the combined data.

The combined data comprises at least one picture, and said displaying the specified part of the combined data on a first display area corresponding to the first terminal on the display screen comprises:

displaying each picture of the at least one picture completely on the first display area; or overlapping pictures corresponding to the first data stored by the first terminal, and displaying pictures corresponding to the first data in a top layer on the first display area.

The present disclosure also provides a data processing device, wherein the data processing device has a display screen, and users of at least two terminals are allowed to simultaneously use a single-screen multi-user service provided by the data processing device, the data processing device comprises:

a connection establishing module configured to establish connection with the at least two terminals;

a first data receiving module configured to receive first data transmitted by a first terminal based on a data sharing rule between the at least two terminals;

a data combining module configured to combine the first data with stored shared data to obtain combined data; and a display module configured to display a specified part of the combined data on the display screen.

Said connection establishing module establishing connection with the at least two terminals comprises:

receiving a connection request from the first terminal of the at least two terminals, and connecting the first terminal to the data processing device based on the connection request; or the data processing device searching for one or more of the at least two terminals which are accessible, and selecting a set number of terminals for access based on connection statuses of connected terminals.

Said connection establishing module connecting the first terminal to the data processing device based on the connection request comprises:

judging whether the number of connected terminals reaches a preset threshold, and if not, accessing the first terminal based on the connection request.

The data processing device further comprises:

a connection judging module configured to, after connecting the first terminal to the data processing device based on the connection request, when the first data has not been received from the first terminal within a preset time period, disconnect the connection with the first terminal and display disconnection information corresponding to the first terminal on the display screen.

Said data combining module combining the first data with stored shared data to obtain combined data comprises:

replacing, with the received first data, shared data of the at least two terminals which has been stored before receiving the first data.

Said data combining module combining the first data with stored shared data to obtain combined data comprises:

obtaining stored shared data of the at least two terminals after receiving the first data; and combining the first data with the stored shared data to obtain the combined data One or more technical solutions according to embodiments of the present disclosure have at least technical effects as follows.

The methods and data processing devices provided in the above embodiments of the present disclosure can effectively protect privacy of multiple users using a single-screen multi-user terminal. In addition, inputs from multiple users may be received depending on permission of a task rule. The methods and data processing devices provided in the embodiments of the present disclosure can simulate a real-life game scenario, and provide better user experience for game users. Also, there is no distance restriction on wireless connection between a computer and a handheld device.

DETAILED DESCRIPTION OF ILLUSTRATIVE EMBODIMENTS

Although the following embodiments of the present disclosure take an AIO system as example, the present disclosure is not limited to the AIO system. For example, a notebook computer may be applied similarly. Based on the following description of the AIO system, implementations with other data processing devices will be apparent.

Figure 1:
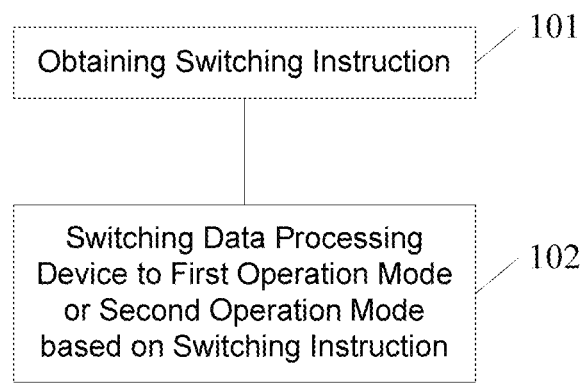
FIG. 1 is a flowchart showing a method for switching an operation mode of a data processing device according to a first embodiment of the present disclosure.

According to a first embodiment of the present disclosure, there is provided a method for switching an operation mode of a data processing device having a screen supporting a multi-touch control function. As shown in FIG. 1, the method includes:

step 101: obtaining a switching instruction; and step 102: switching the data processing device to a first operation mode or a second operation mode based on the switching instruction.

Figure 2:
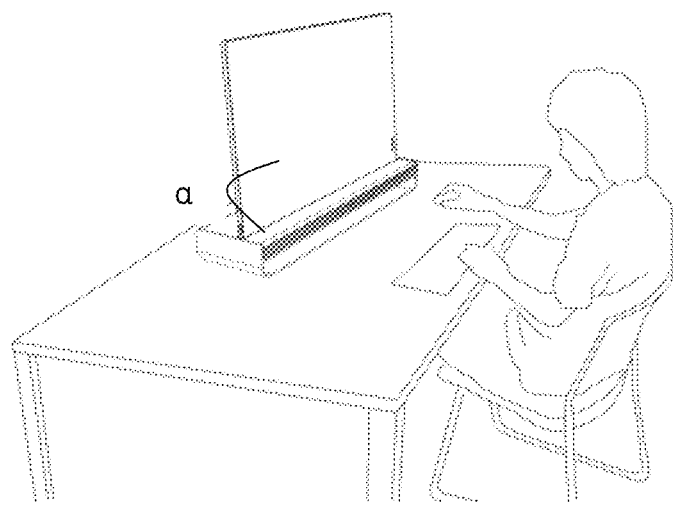
FIG. 2 is a schematic diagram showing a data processing device operating in a first mode according to the first embodiment of the present disclosure.

At step 102, the first operation mode is an operation mode where a user faces the screen from one direction. That is, the AIO system serves as a personal computer that can be operated by only one person at a time, and the user may operate the AIO system using merely keyboard and mouse, as shown in FIG. 2. FIG. 2 illustrates a situation where the AIO system is in the first operation mode.

Figure 3:
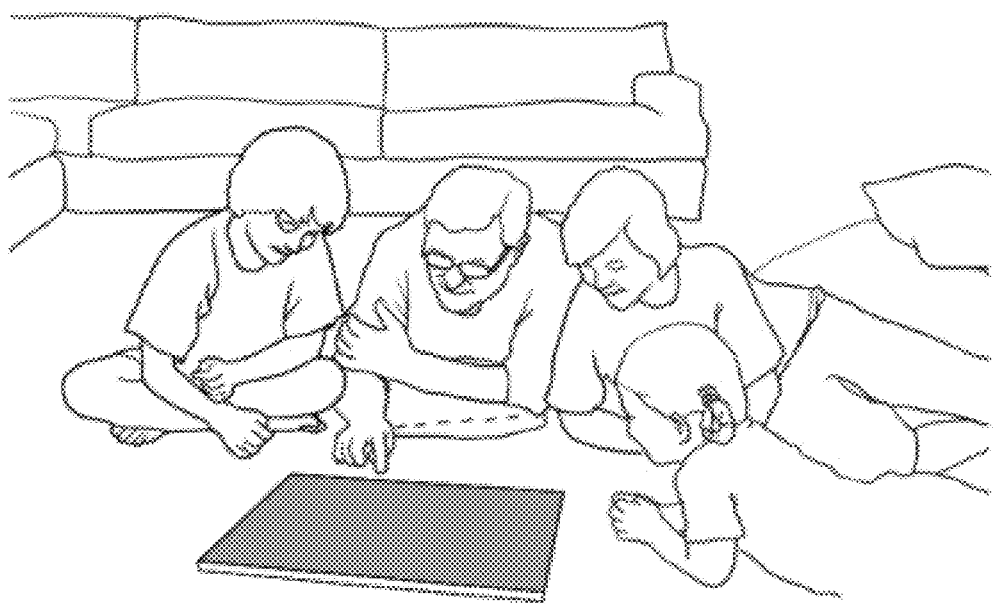
FIG. 3 is a schematic diagram showing a data processing device operating in a second mode according to the first embodiment of the present disclosure.

The second operation mode is an operation mode where at least two users simultaneously operate the AIO system. For example, the at least two users may simultaneously operate different applications. By dividing the screen and in combination with the multi-touch function, a first user may view photos in a first divided screen area, and a second user may check mails in a second divided screen area. Alternatively, at least three users may simultaneously operate a single application. Such application may support the at least three users' simultaneous operations. The application may be displayed on a portion of the screen, or may be displayed in a full-screen form. For example, at least three users may simultaneously play a game on the AIO system in cooperation or as opposite parties, or play a game together for achieving a common goal, as shown in FIG. 3. FIG. 3 illustrates a situation where the AIO system is in the second operation mode. As shown in FIG. 3, in the second operation mode, the AIO system allows multiple users to operate thereon, and thus the AIO system may serve as a home computer which is sufficient for use by all the family members. They may do their own interested or necessary things at the same time. Further, all of the family members may cooperate with each other to accomplish an application without networking. There is no need to operate one after another. Therefore, it is not necessary to provide every member with one AIO system, thereby saving resource and reducing cost. Moreover, all of the family member may sit together and communicate face to face at any time. In this way, in addition to the human-computer interaction, users can communicate with each other, leading to better user experience.

At step 101, obtaining the switching instruction may be implemented in the following two methods, but is not limited thereto.

A first method includes: detecting whether a value of an angle, $\alpha$, between the data processing device (i.e., the AIO system) and a plane where the AIO system is placed is adjusted from a first angle value to a second angle value; judging whether an operation mode corresponding to the second angle value is the same as an operation mode corresponding to the first angle value; and generating the switching instruction when the operation mode corresponding to the second angle value is different from the operation mode corresponding to the first angle value. For example, in the situation shown in FIG. 2, the first angle value is, e.g., 75 degree, the AIO system corresponds to the first operation mode. When the AIO system is adjusted from the situation of FIG. 2 to the situation of FIG. 3, the second angle value is 0 degree. At this time, the second angle value corresponds to the second operation mode, thus the operation mode corresponding to the first angle value is different from the operation mode corresponding to the second angle value. In this case, an application is invoked to generate the switching instruction. Then, the method proceeds to step 102.

The second method includes: when the user presses a mechanical key on the AIO system or a screen of the AIO system, or runs an application on the AIO system, the switching instruction is generated. Then, the method proceeds to step 102. In this case, the value of the angle, $\alpha$, between the AIO system and the plane where the AIO system is placed may take any value between 0 degree and 90 degree. It is also possible to make the operation mode correspond to the value of the angle, a. The correspondence is as introduced in the first method, and the only difference is that generation of the switching instruction is manually triggered at a corresponding angle.

Although the above first method takes 75 degree as example of the angle, α, corresponding to the first operation mode, in practical applications, any angle value within a first angle range (e.g., from 60 degree to 90 degree) for the angle, α, may correspond to the first operation mode, and any angle value within a second angle range (e.g., from 0 degree to 30 degree) for the angle, α, may correspond to the second operation mode. Furthermore, the AIO system may further include a third operation mode to which the angle value, α, within a third angle range (e.g., from 30 degree to 60 degree) corresponds. Any angle value within the first angle range is larger than any angle value within the third angle range. Any angle value within the third angle range is larger than any angle value within the second angle range.

Figure 4A:
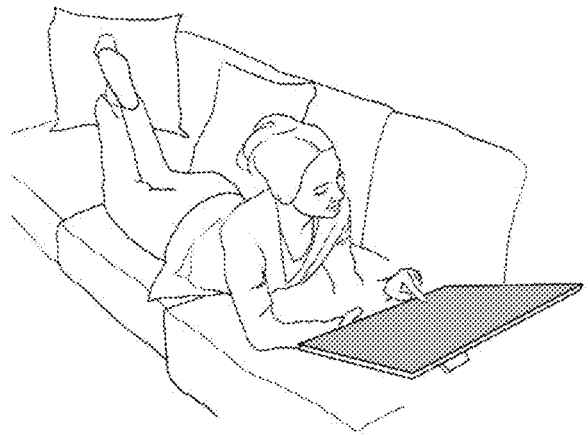
FIGS. 4a and 4b are schematic diagrams showing a data processing device operating in a third mode according to the first embodiment of the present disclosure.
Figure 4B:
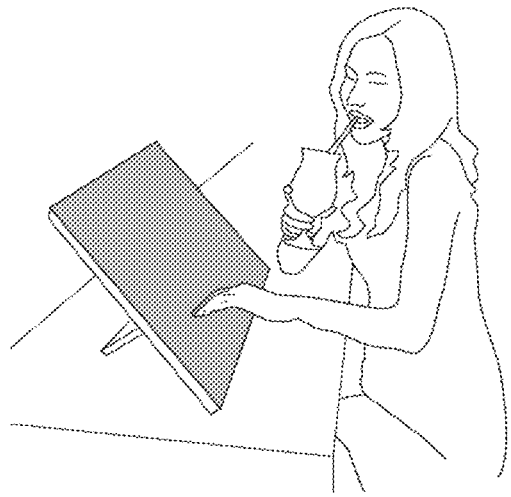
Figure 5:
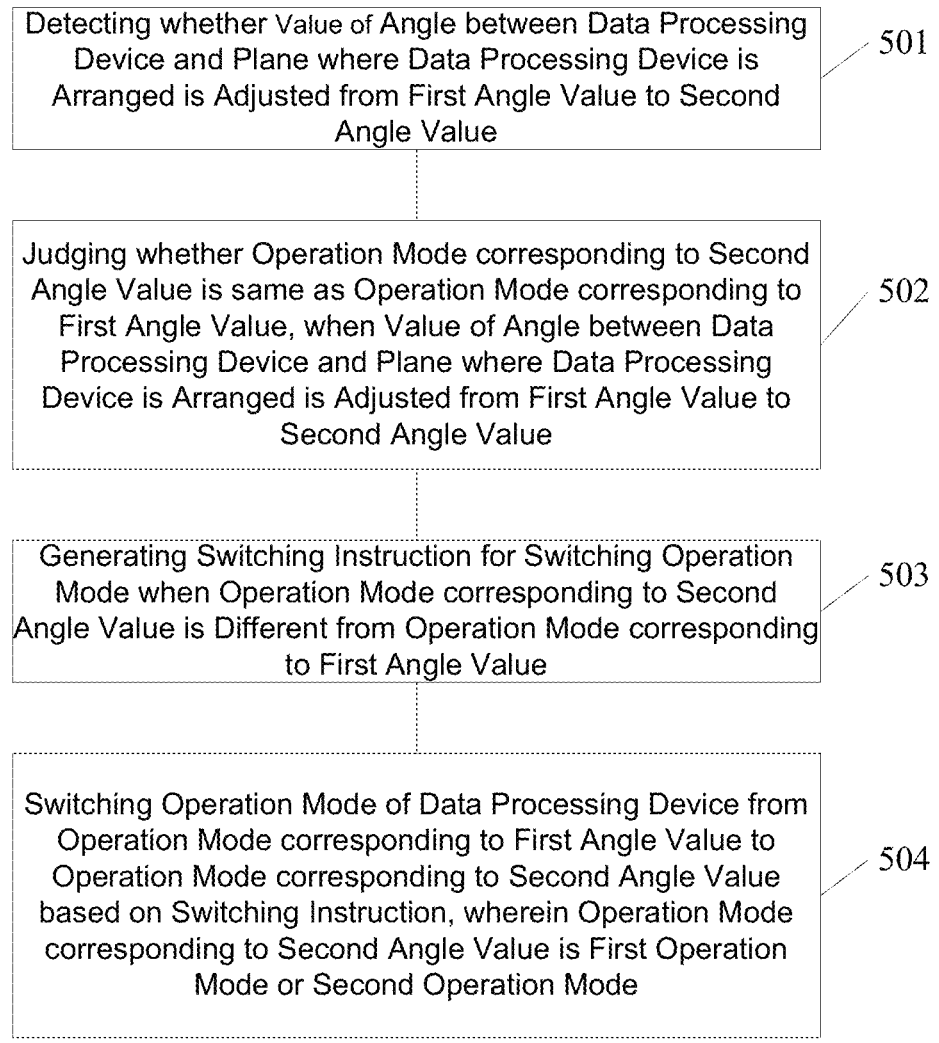
FIG. 5 is a flowchart showing a method for switching an operation mode of a data processing device according to a second embodiment of the present disclosure.

In the third operation mode, the angle is suitable for touch and control the screen, and the user will not feel tired in his or her arms even using for a long time. It is much more comfortable than the first operation mode. As show in FIGS. 4a and 4b, the user may lie on his or her face on the sofa to use the device, or puts the device on the desk for use. In either case, the user does not have to lift his or her arms, thus it is more comfortable.

According to a second embodiment of the present disclosure, there is provided a method for switching an operation mode of a data processing device. This embodiment takes an AIO system as example of the data processing device, and the data processing device has a screen supporting a multi-touch control function. In this embodiment, the AIO system also includes two operation modes, i.e., the first operation mode and the second operation mode. Descriptions of the first operation mode and the second operation mode are the same with those in the first embodiment, and will be omitted here, for sake of brevity. As shown in FIG. 4, the method includes:

step 501: detecting whether a value of an angle between the data processing device and a plane where the data processing device is placed is adjusted from a first angle value to a second angle value;

step 502: judging whether an operation mode corresponding to the second angle value is the same as an operation mode corresponding to the first angle value, when the value of the angle between the data processing device and the plane where the data processing device is placed is adjusted from the first angle value to the second angle value;

step 503: generating a switching instruction for switching the operation mode when the operation mode corresponding to the second angle value is different from the operation mode corresponding to the first angle value; and step 504: switching the operation mode of the data processing device from the operation mode corresponding to the first angle value to the operation mode corresponding to the second angle value based on the switching instruction, wherein the operation mode corresponding to the second angle value is the first operation mode or the second operation mode.

Furthermore, in this embodiment, the AIO system further includes a third operation mode. The third operation mode is the same as that in the first embodiment and the details thereof will be omitted here.

According to a third embodiment of the present disclosure, there is further provided a method for switching an operation mode of a data processing device. Details of similarities between the third embodiment and the first embodiment will be omitted here. The third embodiment differs from the second embodiment in that the second operation mode is different. In the third embodiment, when the data processing device is in the second operation mode, the screen has at least two display areas, and a display direction in which content is displayed in the at least two display areas is changed under control of a display direction control instruction generated by the data processing device. A first display area of the at least two display areas has a first display content. A second display area of the at least two display areas has a second display content. A display direction of the first display content is different from that of the second display content. In addition, the at least two display areas may display different applications or a single application. For example, when two different users view content displayed on the screen from two opposite directions, both of them can directly see the displayed content which is displayed in the two display areas respectively along opposite directions. Similarly, the screen may have three, four or more display areas, and display directions of content in these display area may be the same or different. Whether to display the content towards a direction may be determined by detecting whether there is a user in the direction. It is also possible to generate a display direction control instruction to control the display direction based on a request inputted by the user. The present embodiment is not limited thereto, and those skilled in the art may control the display direction in some other manners.

According to a fourth embodiment of the present disclosure, there is further provided a method for switching an operation mode of a data processing device. Details of similarities between the fourth embodiment and the second embodiment will be omitted here. The fourth embodiment differs from the second embodiment in that the second operation mode is different. In the fourth embodiment, when the data processing device is in the second operation mode, the screen has at least two display areas, and a display direction in which content is displayed in the at least two display areas is changed under control of a display direction control instruction generated by the data processing device. A first display area of the at least two display areas has a first display content. A second display area of the at least two display areas has a second display content. A display direction of the first display content is different from that of the second display content. In addition, the at least two display areas may display different applications or the same application. For example, when two different users views content displayed on the screen from two opposite directions, both of them can directly see the displayed content which is displayed in the two display areas respectively along opposite directions. Similarly, the screen may have three, four or more display areas, and display directions of content in the display areas may be the same or different. Whether to display the content towards a direction may be determined by detecting whether there is a user in the direction. It is also possible to generate a display direction control instruction to control the display direction based on a request inputted by the user. The present embodiment is not limited thereto, and those skilled in the art may control the display direction in some other manners.

Figure 6:
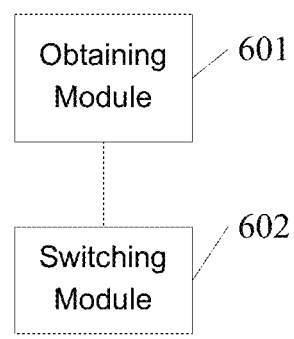
FIG. 6 is a functional block diagram showing an apparatus for switching an operation mode of a data processing device according to a fifth embodiment of the present disclosure.

According to a fifth embodiment of the present disclosure, there is provided an apparatus for switching an operation mode of a data processing device. The apparatus is configured to implement the method in the first embodiment. As shown in FIG. 6, the apparatus includes an obtaining module 601 for obtaining a switching instruction, and a switching module 602 for switching the data processing device to a first operation mode or a second operation mode based on the switching instruction. Details of the first operation mode and the second operation mode may refer to description in the first embodiment, and thus will be omitted here.

The obtaining module 601 may have, but not limited to, the following two implementations.

In one of the implementations, the obtaining module 601 includes: a detecting unit configured to detect whether a value of an angle between the data processing device and a plane where the data processing device is placed is adjusted from a first angle value to a second angle value; a judging unit configured to judge whether an operation mode corresponding to the second angle value is the same as an operation mode corresponding to the first angle value; and a generating unit configured to generate the switching instruction when the operation mode corresponding to the second angle value is different from the operation mode corresponding to the first angle value.

In the other implementation, the obtaining module 601 includes a generating unit configured to generate the switching instruction based on a user's operation on the screen or a mechanical key on the data processing device.

Details of the two implementations have been described in the first embodiment, and will be omitted here, for sake of brevity.

Moreover, variants of the first embodiment can be applied in the apparatus of this embodiment.

Figure 7:
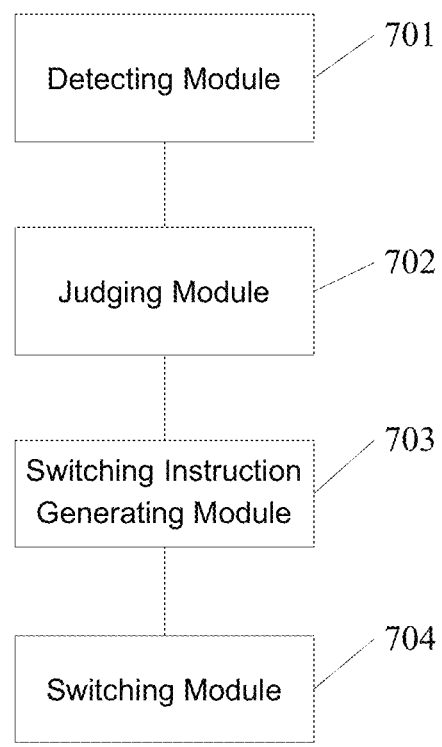
FIG. 7 is functional block diagram showing an apparatus for switching an operation mode of a data processing device according to a sixth embodiment of the present disclosure.

According to a sixth embodiment of the present disclosure, there is provided an apparatus for switching an operation mode of a data processing device. The apparatus is configured to implement the method in the second embodiment. This embodiment takes an AIO system as example of the data processing device, and the data processing device has a screen supporting a multi-touch control function. The AIO system also includes two operation modes, i.e., the first operation mode and the second operation mode. Descriptions of the first operation mode and the second operation mode are the same as those in the first embodiment, and will be omitted here, for sake of brevity. As shown in FIG. 7, the apparatus includes:

a detecting module 701 configured to detect whether a value of an angle between the data processing device and a plane where the data processing device is placed is adjusted from a first angle value to a second angle value;

a judging module 702 configured to judge whether an operation mode corresponding to the second angle value is the same as an operation mode corresponding to the first angle value, when the value of angle between the data processing device and a plane where the data processing device is placed is adjusted from the first angle value to the second angle value;

a switching instruction generating module 703 configured to generate a switching instruction for switching the operation mode when the operation mode corresponding to the second angle value is different from the operation mode corresponding to the first angle value; and a switching module 704 configured to switch the operation mode of the data processing device from the operation mode corresponding to the first angle value to the operation mode corresponding to the second angle value based on the switching instruction, wherein the operation mode corresponding to the second angle value is the first operation mode or the second operation mode.

Based on the detailed descriptions of the method in the second embodiment, specific implementations of the apparatus in this embodiment are apparent, and variants of the second embodiment can be applied in the apparatus of this embodiment. Thus, details thereof will be omitted here.

According to a seventh embodiment of the present disclosure, there is provided an apparatus for switching an operation mode of a data processing device. The apparatus is configured to implement the method in the third embodiment. The apparatus in this embodiment differs from that in the fifth embodiment in that the second operation mode is different. In this embodiment, when the data processing device is switched to the second operation mode, the screen has at least two display areas, and a display direction in which content is displayed in the at least two display areas is changed under control of a display direction control instruction generated by the data processing device. Detailed description of the second operation mode in this embodiment has been made in the third embodiment and will be omitted here, for sake of brevity.

According to an eighth embodiment of the present disclosure, there is provided an apparatus for switching an operation mode of a data processing device. The apparatus is configured to implement the method in the fourth embodiment. The device in this embodiment differs from that in the sixth embodiment in that the second operation mode is different. In this embodiment, when the data processing device is switched to the second operation mode, the screen has at least two display areas, and a display direction in which content is displayed in the at least two display areas is changed under control of a display direction control instruction generated by the data processing device. Detailed description of the second operation mode in this embodiment has been made in the third embodiment and will be omitted here, for sake of brevity.

Figure 8A:
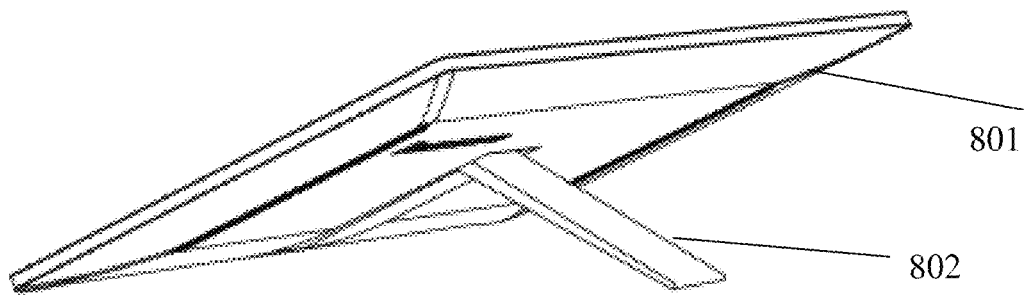
FIGS. 8a and 8b are block diagrams showing a data processing device according to a ninth embodiment of the present disclosure.

According to a ninth embodiment of the present disclosure, there is provided a data processing device. As shown in FIG. 8a, the data processing device includes a display 801 and an angle adjustment structure 802. The display 801 includes a screen supporting a multi-touch control function and a case for accommodating and fixing the screen. The case has a back surface. The angle adjustment structure 802 includes a rotating structure arranged on the back surface and a supporting structure, one end of which is connected to the rotating structure. The supporting structure cooperates with the rotating structure so that an angle between the data processing device and a plane where the data processing device is placed can be changed. Furthermore, the supporting structure cooperates with the rotating structure so that the data processing device can keep in a fixed state at any angle. Then, the user may use the data processing device at any angle. Detailed structures of the rotating structure and the supporting structure will be apparent from existing technologies, and thus will be omitted here.

Figure 8B:
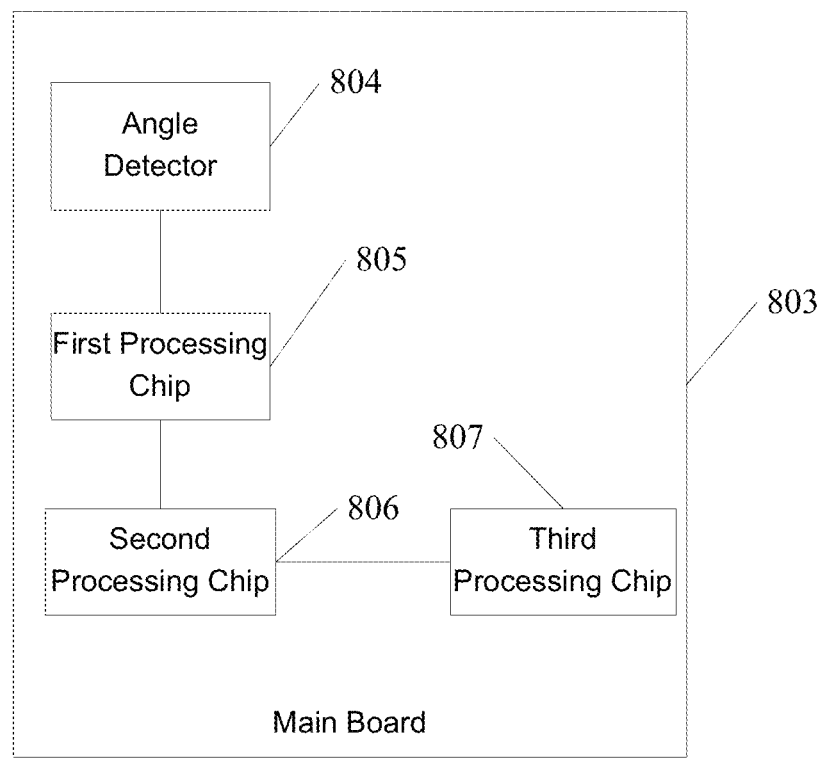

Referring to FIG. 8b again, the data processing device further includes a main board 803 arranged in the case; an angle detector 804; a first processing chip 805, a second processing chip 806; and a third processing chip 807. The angle detector 804 may be arranged either in the rotating structure or in the main board. In this embodiment, for example, the angle detector 804 is arranged in the main board 803 and configured to detect whether a value of the angle between the data processing device and a plane where the data processing device is placed is adjusted from a first angle value to a second angle value. The first processing chip 805 is arranged on the main board 803 and configured to judge whether an operation mode corresponding to the second angle value is the same as an operation mode corresponding to the first angle value, when the angle between the data processing device and the plane where the data processing device is placed is adjusted from the second angle value to the second angle value. The second processing chip 806 is arranged on the main board 803 and configured to generate a switching instruction for switching the operation mode when the operation mode corresponding to the second angle value is different from the operation mode corresponding to the first angle value. The third processing chip 807 is arranged on the main board and configured to switch the operation mode of the data processing device from the operation mode corresponding to the first angle value to the operation mode corresponding to the second angle value based on the switching instruction. The operation mode corresponding to the second angle value is the first operation mode or the second operation mode. The first processing chip 805, the second processing chip 806, and the third processing chip 807 are the same chip, or individual chips separately arranged on the main board 803.

The first operation mode is an operation mode where the angle between the data processing device and the plane where the data processing device is placed is within a first angle range. The second operation mode is an operation mode where the angle between the data processing device and the plane where the data processing device is placed is within a second angle range. The second operation mode is different from the first operation mode. The second operation mode is a mode where at least two users simultaneously operate different applications or a mode where at least three users simultaneously operate the same application, which supports at least three users operating simultaneously. Any angle within the first angle range is larger than any angle within the second angle range.

Furthermore, the data processing device further includes a third operation mode, where the angle between the data processing device and the plane where the data processing device is placed is within a third angle range. Any angle within the first angle range is larger than any angle within the third angle range, and any angle within the third angle range is larger than any angle within the second angle range. The operation mode corresponding to the second angle value is the first operation mode, the second operation mode, or the third operation mode.

Detailed description of the first operation mode, the second operation mode and the third operation mode and various angle ranges has been made in the first embodiment, and thus will be omitted here, for sake of brevity.

According to a tenth embodiment of the present disclosure, there is further provided a data processing device. The data processing device in this embodiment differs from that of the ninth embodiment in that the second operation mode is different. In this embodiment, in the second operation mode, the screen has at least two display areas. The data processing device further includes a fourth processing chip. The fourth processing chip is arranged on the main board and configured to generate a display direction control instruction when the data processing device operates in the second operation mode. The display direction control instruction is used to control change of a display direction in which content is displayed in the at least two display areas. The first processing chip, the second processing chip, the third processing chip, and the fourth processing chip are the same chip, or individual chips separately arranged on the main board. Detailed description of the second operation mode in this embodiment has been made in the third embodiment, and thus will be omitted here.

The embodiments of the present disclosure switch one data processing device among different operation modes, so that the data processing device may serve as either a personal computer or a computer shared by family members. That is, the data processing device may be operated by either one person or multiple persons at the same time. In the latter case, at least two users may simultaneously operate different applications, or at least three users may simultaneously operate one application, thereby reducing hardware cost and facilitating face-to-face communication among the users.

Furthermore, according to an embodiment of the present disclosure, the second operation mode may allow multiple users to simultaneously see directly a content displayed on the screen from different angles. It is thus more user-friendly and convenient.

Furthermore, according to an embodiment of the present disclosure, the operation mode of the data processing device is associated with an angle between the data processing device and a plane in which the data processing device is placed. When the angle is large, for example, 75 degree, the operation mode is the first operation mode, that is, a single-person operation mode. When the angle is 0 degree, the operation mode is the second operation mode. At this time, the data processing device is laid flat on a horizontal plane, and it is suitable for a multi-person operation mode. Therefore, such human-engineering mode switching design is more convenient.

An embodiment of the present disclosure further provides a method for displaying data. The method includes: when users of at least two terminals simultaneously use a single-screen multi-user service provided by a data processing device, establishing connection between the data processing device and the at least two terminals, and receiving first data transmitted by a first terminal based on a data sharing rule between the at least two terminals; combining the first data with stored shared data to obtain combined data; and displaying a specified part of the combined data on a display screen of the data processing device, i.e., transforming the combined data into shared data.

Figure 9:
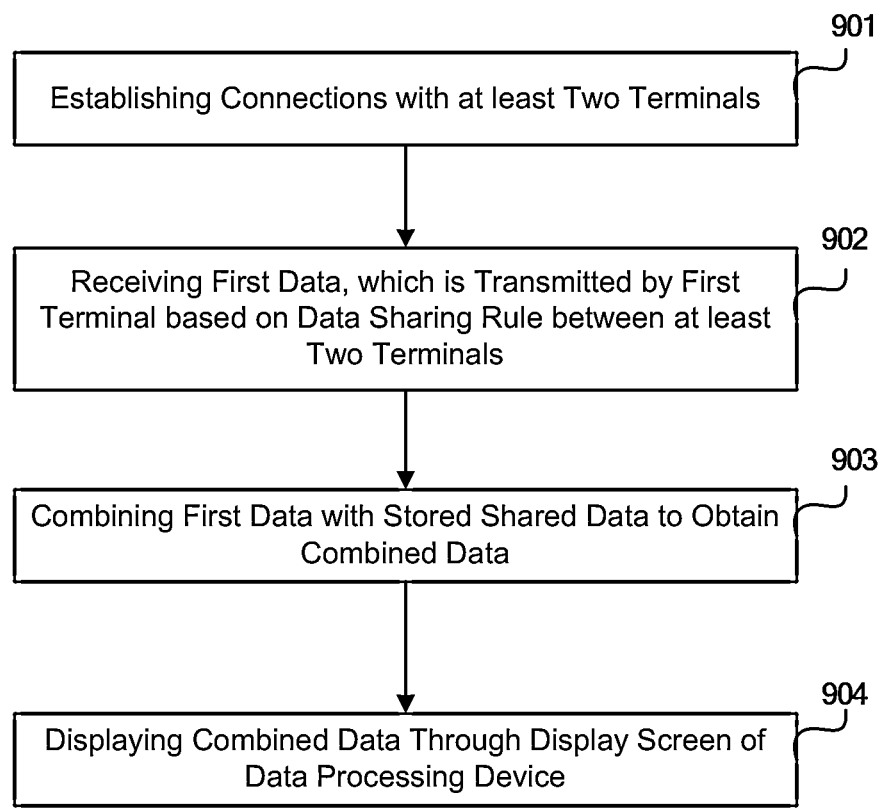
FIG. 9 is a flowchart showing a method for displaying data according to an embodiment of the present disclosure.

As shown in FIG. 9, an embodiment of the present disclosure provides a method for displaying data. The method is applied when users of at least two terminals simultaneously use a single-screen multi-user service provided by a data processing device. The single-screen multi-user service may be, when one screen of the data processing device is provided for use by multiple users at the same time, the screen provided by the data processing device is divided into multiple sub-screens, and then each user may be served by a corresponding sub-screen. A specific implementation of the present disclosure will be explained in detail in connection with the drawings.

In an embodiment of the present disclosure, the method includes step 901 of establishing connection with the at least two terminals.

In this embodiment, connection with the at least two terminals may be established in any of the following manners, but not limited thereto.

(1) A connection request is received from the first terminal of the at least two terminals, and the first terminal is connected to the data processing device based on the connection request.

In an embodiment of the present disclosure, a user's terminal and the data processing device may be in a local area network at home. The data processing device accesses a home network in a wired or wireless manner. The user's terminal may wirelessly access the home network via wifi.

(2) The data processing device searches for one or more of the at least two terminals which is accessible, and selects a set number of terminals to access based on connection statuses of connected terminals.

In an embodiment, due to limitation on device interface and how many users can have access, the number of terminals that can be connected to the data processing device is limited. Accordingly, connecting the first terminal to the data processing device based on the connection request may include:

judging whether the number of connected terminals reaches a preset threshold, and if not, connecting the first terminal to the data processing device based on the connection request; and if yes, rejecting access of the terminal.

At step 902, the first data transmitted by the first terminal based on a data sharing rule between the at least two terminals is received.

In an embodiment of the present disclosure, the first data is data to be sent to the display screen of the data processing device for display, when respective terminals connected to the data processing device interact with the data processing device.

At step 903, the first data is combined with stored shared data to obtain combined data.

At step 904, a specified part of the combined data is displayed through the display screen. That is, the combined data is transformed into shared data.

Furthermore, in order to determine connection statues of connected terminals in real time, the data processing device periodically detects whether there is data transmitted from the connected terminal devices. The method further includes step 905.

At step 905, when the first data have not been received from respective terminals within a preset time period, the connection with the first terminal is disconnected, and disconnection information of the first terminal is displayed on the display screen.

In an embodiment of the present disclosure, the shared data may be displayed in various manners.

(1) Shared data of the at least two terminals, which has been stored before receiving the first data, is replaced with the received first data. That is, the combined data is the first data.

(2) Stored shared data corresponding to the first terminal, which was received before receiving the first data, is obtained. The first data is combined with the stored and shared data to obtain the combined data. A specified part of the combined data is displayed on a first display area corresponding to the first terminal on the display screen.

When the combined data is at least one picture, displaying the specified part of the combined data on the first display area corresponding to the first terminal the display screen includes:

displaying each picture of the at least one picture completely on the first display area; or overlapping pictures corresponding to the first data stored by the first terminal, and displaying pictures corresponding to the first data at the top layer on the first display area.

(3) The stored shared data of the at least two terminals is obtained after receiving the first data. The first data is combined with the stored shared data to obtain the combined data.

When the shared data is displayed in the form of a picture, each picture of the at least one picture is displayed completely on the first display area; or pictures corresponding to the first data stored by the first terminal are overlapped, and the pictures corresponding to the first data are displayed at the top layer on the first display area.

(4) After the first data is received, the stored shared data is blurred to obtain background data. Then, combining the first data with the stored shared data includes using the background data as a background pattern displayed by the first data.

Figure 10:
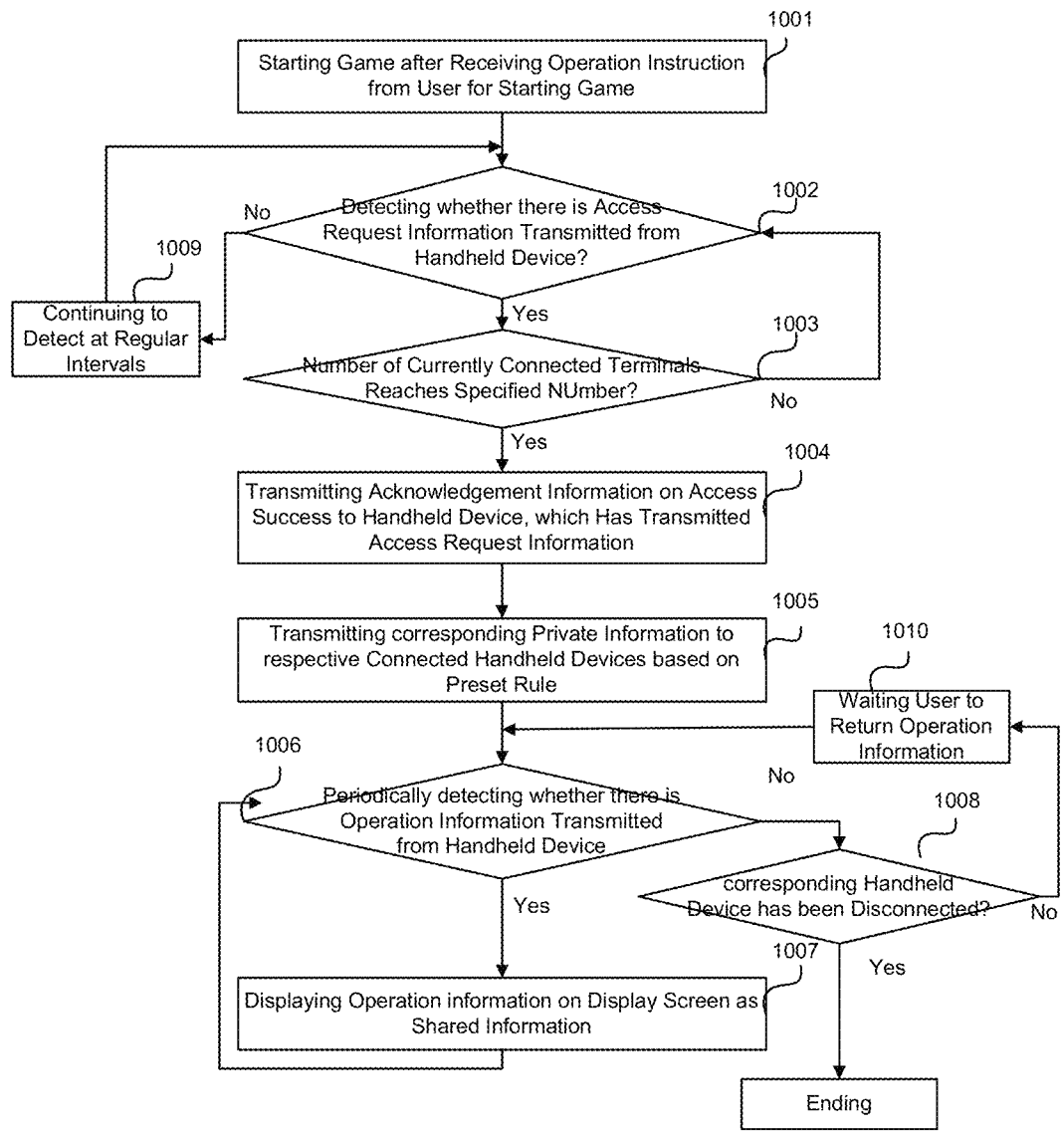
FIG. 10 is a flowchart showing operations of a home computer in playing games in which a method according to an embodiment of the present disclosure is applied.
Figure 11:
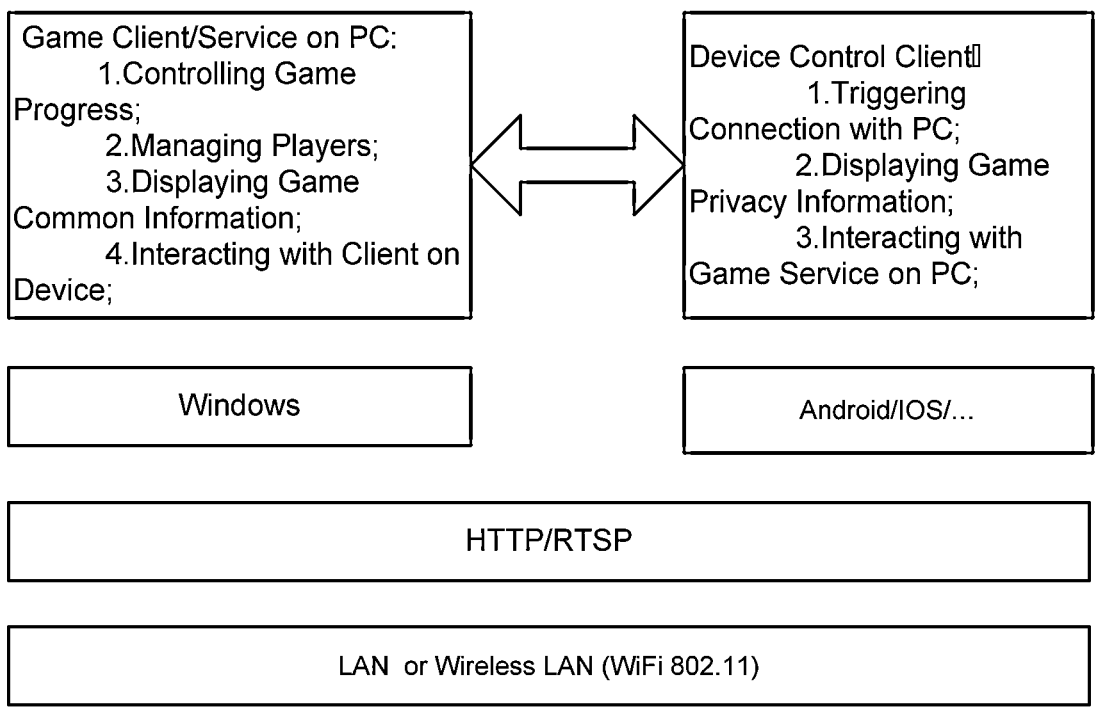
FIG. 11 is a schematic diagram showing an application architecture of a method, a data device and a terminal according to an embodiment of the present disclosure.

As shown in FIG. 10, the method provided by the embodiments of the present disclosure may be applied to perform network games, in which multiple users use a common display screen (e.g., an application architecture as shown in FIG. 11). In this embodiment, the data processing device is a home computer supporting single-screen multi-user, and the multiple terminals are handheld terminal devices of the user (including any wired or wireless terminal device connectable to the network). Then, a specific implementation of the home computer implementing the method is described as follows.

At step 1001, a game is started after receiving an operation instruction from a user for starting the game.

At step 1002, it is detected whether there is access request information transmitted from any of the handheld devices. If yes, the method proceeds to step 1003. Otherwise, the method proceeds to step 1009, where the detecting continues at regular intervals.

At step 1003, it is judged whether the number of currently connected terminals reaches a specified number. If yes, the method returns to step 1002. Otherwise, the method proceeds to step 1004.

At step 1004, acknowledgement information of successful access is transmitted to the handheld device which has transmitted the access request information.

At step 1005, corresponding private information is transmitted to each of the connected handheld devices based on a preset rule.

At step 1006, it is periodically detected whether there is operation information transmitted from any of the handheld devices based on a preset rule. If yes, the method proceeds to step 1007. If no, the method proceeds to step 1008.

At step 1007, the operation information is displayed on the display screen as shared information. Then the method proceeds to step 1006.

At step 1008, it is judged whether any handheld device has been disconnected. If no, the method proceeds to step 1010 of transmitting corresponding prompt information to the handheld device. If yes, information on the handheld device is deleted, and the flow ends.

Figure 12:
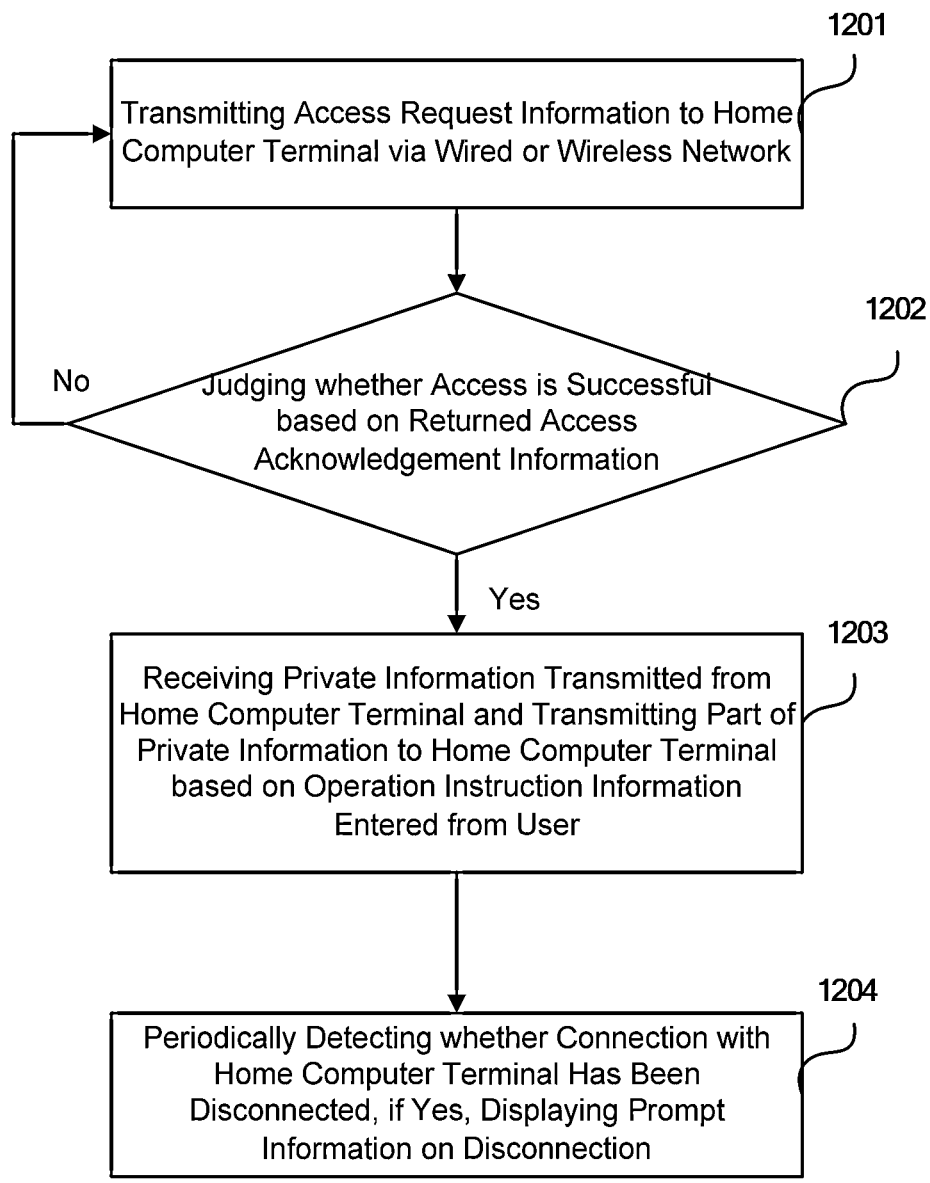
FIG. 12 is a flowchart showing operations of a handheld terminal device in playing games in which a method according to an embodiment of the present disclosure is applied.

As shown in FIG. 12, a specific method implemented by a handheld device is described as follows based on the above implementation of the home computer.

At step 1201, access request information is transmitted to a home computer via a wired or wireless network.

At step 1202, it is judged whether access is successful based on access acknowledgement information returned from the home computer. If yes, the method proceeds to step 1203. Otherwise, the method proceeds to step 1201.

At step 1203, private information transmitted from the home computer is received, and a part of the private information is transmitted to the home computer based on operation instruction information inputted by the user.

At step 1204, it is periodically detected whether a connection with the home computer is terminated, and if yes, prompt information on the disconnection is displayed.

The embodiment of the present disclosure may firstly search for an accessible handheld terminal device based on a game rule by the home computer, and then select a preset number of terminals to connect to the system based on specific connection statuses of handheld terminals which have already gained access to the home computer.

In addition, multiple terminals may be connected to the home computer terminal through physical connections.

Figure 13:
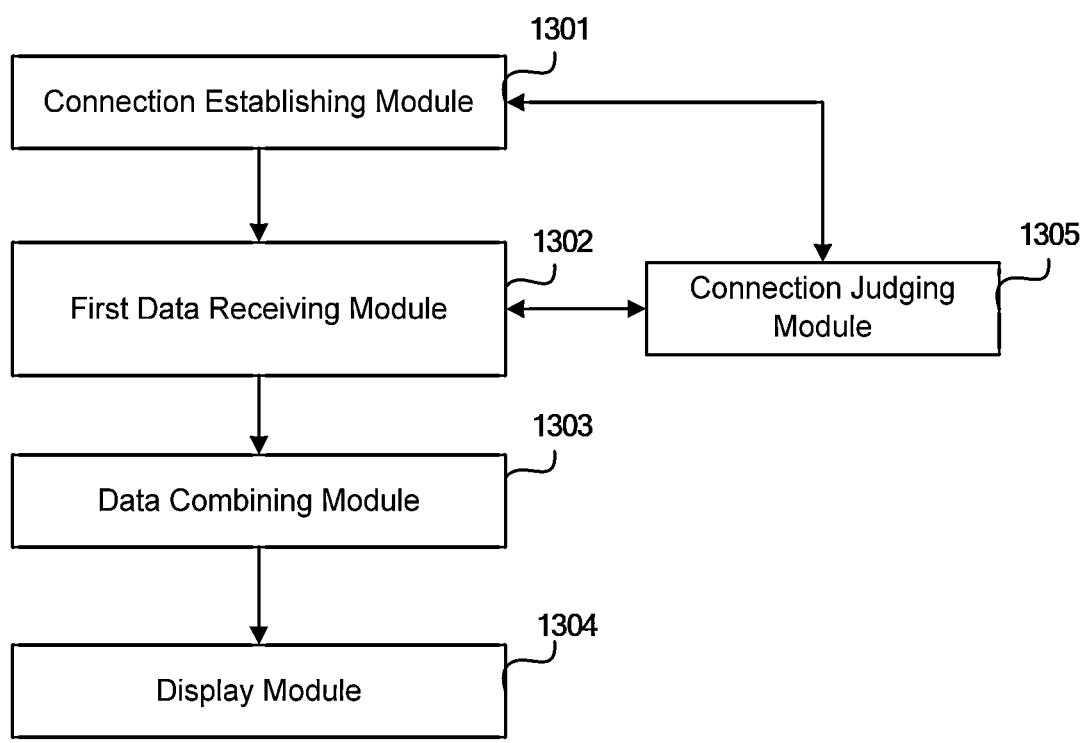
FIG. 13 is a schematic block diagram showing a data processing device according to an embodiment of the present disclosure.

As shown in FIG. 13, an embodiment of the present disclosure further provides a data processing device. The data processing device may connect to at least two terminals and have a display screen. Users of the at least two terminals can simultaneously use a single-screen multi-user service provided by the data processing device. The data processing device includes a connection establishing module 1301, a first data receiving module 1302, a data combining module 1303, a display module 1304, and a connection judging module 1305.

The connection establishing module 1301 is configured to establish connections with the at least two terminals.

In an embodiment of the present disclosure, the connection establishing module 1301 may establish connections with the at least two terminals in at least one of the following manners:

receiving a connection request from the first terminal of the at least two terminals, and connecting the first terminal to the data processing device based on the connection request; or the data processing device searching for an accessible terminal of the at least two terminals, and selecting a set number of terminals to access based on connection statuses of connected terminals.

Furthermore, the connection establishing module connecting the first terminal to the data processing device based on the connection request includes:

judging whether the number of the connected terminals reaches a preset threshold, and if not, accessing the first terminal based on the connection request.

The first data receiving module 1302 is configured to receive first data transmitted by a first terminal based on a data sharing rule between the at least two terminals.

The data combining module 1303 is configured to combine the first data with stored shared data to obtain combined data.

The display module 1304 is configured to display a specified part of the combined data on a display screen of the data processing device.

The connection judging module 1305 is configured to, after connecting the first terminal to the data processing device based on the connection request, and when the first data has not been received from the first terminal within a preset time period, disconnect the connection with the first terminal and display disconnection information of the terminal on the display screen.

In an embodiment of the present disclosure, the shared data information may be displayed in various manners.

(1) The data combining module 1303 combines the first data with stored shared data to obtain combined data by replacing shared data of the at least two terminals, which has been stored before receiving the first data, with the received first data.

(2) The data combining module combines the first data with stored shared data to obtain combined data by obtaining stored shared data of the at least two terminals after receiving the first data; and combining the first data with the stored shared data to obtain the combined data.

One or more technical solutions according to the embodiments of the present disclosure present at least technical effects as follows.

The methods and data processing devices according to the embodiments of the present disclosure display shared information on a display screen commonly used by multiple users and display private information of each user in his or her own handheld terminal device. In this way, when a multi-user game is installed on a conventional computer, a home computer may be responsible for authentication of game users and logic control of the whole game, and display all visible information in a public area of the game. An application installed in a user's handheld device is responsible for initiating a connection with game users and controlling user operations during the game, and the user's handheld device displays information allowed to be seen by only the user himself. When a game user shows his or her cards or performs another operation, a part related to such operation on the public area of the conventional computer is updated in real time, so that the game user may have experience of realistic game scenario with an electronic device.

The methods and data processing devices provided in the present disclosure may effectively protect privacy of multiple users connected to a single-screen multi-user terminal. In addition, inputs from multiple users may be received depending on permission of a task rule. The methods and data processing devices can simulate realistic game scenario, thereby providing better user experience for game users. There is no distance limitation on a wireless connection between a computer and a handheld device.

It should be understood by those skilled in the art that various modifications and variants can be made to the present disclosure without departing from the spirit and scope of the present disclosure. If these modifications and variants to the present disclosure fall within the scope of the claims and equivalents thereof, the present disclosure is also intended to encompass these modifications and variants.

What is claimed is:

1. A method for switching an operation mode of a data processing device having a screen supporting a multi-touch control function, wherein the data processing device has a first operation mode where an angle between the data processing device and a plane in which the data processing device is placed is within a first angle range, and a second operation mode where the angle between the data processing device and the plane in which the data processing device is placed is within a second angle range, any of the angle within the first angle range is greater than any of the angle within the second angle range;

wherein the second operation mode is different from the first operation mode, and the second operation mode is a mode where at least two users simultaneously operate different applications or a mode where at least three users simultaneously operate the same application, the same application supporting the at least three users' simultaneous operations;

wherein the method comprises:

detecting whether a value of an angle between the data processing device and a plane in which the data processing device is placed is adjusted from a first angle value to a second angle value;

judging whether an operation mode corresponding to the second angle value is the same as an operation mode corresponding to the first angle value in response to the adjusting being detected;

generating a switching instruction for switching the operation mode in response to determining the operation mode corresponding to the second angle value is different from the operation mode corresponding to the first angle value;

switching the operation mode of the data processing device from the operation mode corresponding to the first angle value to the operation mode corresponding to the second angle value based on the switching instruction, wherein the operation mode corresponding to the second angle value is one of the first or second operation mode;

wherein in the second operation mode, the screen has at least two display areas, and a display direction in which content is displayed in the at least two display areas is changed according to a display direction control instruction for controlling the display direction;

wherein the display direction control instruction is generated by the data processing device by detecting whether there is a user in a direction and whether to display the content towards the direction.

2. The method of claim 1, wherein the data processing device further comprises a third operation mode where the angle between the data processing device and the plane in which the data processing device is placed is within a third angle range, wherein any angle value within the first angle range is larger than any angle value within the third angle range, and any angle value within the third angle range is larger than any angle value within the second angle range;

wherein the operation mode corresponding to the second angle value is one of the first, second or third operation mode.

3. The method of claim 1, characterized in that, said obtaining the switching instruction comprises:

generating the switching instruction based on an operation by a user on the screen or a mechanical key on the data processing device.

4. A method for switching an operation mode of a data processing device having a screen supporting a multi-touch control function, wherein the method comprises:

detecting whether a value of an angle between the data processing device and a plane in which the data processing device is placed is adjusted from a first angle value to a second angle value;

judging whether an operation mode corresponding to the second angle value is the same as an operation mode corresponding to the first angle value in response to the adjusting being detected;

generating a switching instruction for switching the operation mode in response to determining that the operation mode corresponding to the second angle value is different from the operation mode corresponding to the first angle value; and switching the operation mode of the data processing device from the operation mode corresponding to the first angle value to the operation mode corresponding to the second angle value based on the switching instruction, wherein the operation mode corresponding to the second angle value is one of the first or second operation mode;

wherein in the second operation mode, the screen has at least two display areas, and a display direction in which content is displayed in the at least two display areas is changed according to a display direction control instruction for controlling the display direction;

wherein the display direction control instruction is generated by the data processing device by detecting whether there is a user in a direction and whether to display the content towards the direction.

5. The method of claim 4, characterized in that, a first display area of the at least two display areas has a first display content, a second display area of the at least two display areas has a second display content, and a display direction of the first display content is different from that of the second display content.

6. The method of claim 4, characterized in that, the first operation mode is an operation mode where the angle between the data processing device and the plane in which the data processing device is placed is within a first angle range, and the second operation mode is an operation mode where the angle between the data processing device and the plane in which the data processing device is placed is within a second angle range.

7. The method of claim 6, characterized in that, the data processing device further comprises a third operation mode where the angle between the data processing device and the plane in which the data processing device is placed is within a third angle range, wherein any angle value within the first angle range is larger than any angle value within the third angle range, and any angle value within the third angle range is larger than any angle value within the second angle range;

wherein the operation mode corresponding to the second angle value is one of the first, second or third operation mode.

8. The method of claim 4, characterized in that, said obtaining the switching instruction comprises:

generating the switching instruction based on an operation by a user on the screen or a mechanical key on the data processing device.

9. A data processing device, wherein an operation mode of the data processing device comprises: a first operation mode where an angle between the data processing device and a plane in which the data processing device is placed is within a first angle range; and a second operation mode where the angle between the data processing device and the plane in which the data processing device is placed is within a second angle range, wherein the second operation mode is different from the first operation mode, and the second operation mode is an operation mode where at least two users simultaneously operate different applications or a mode where at least three users simultaneously operate the same application, the same application supporting the at least three users' simultaneous operations, and wherein any angle value within the first angle range is larger than any angle value within the second angle range, wherein the data processing device comprises:

a display comprising a screen having a multi-touch control function, and a case for accommodating and fixing the screen, the case having a back surface;

an angle adjustment structure comprising a rotating structure arranged on the back surface, and a supporting structure one end of which is connected to the rotating structure, wherein the supporting structure cooperates with the rotating structure so that an angle between the data processing device and a plane in which the data processing device is placed can be changed;

an angle detector configured to detect whether a value of the angle between the data processing device and the plane in which the data processing device is placed is adjusted from a first angle value to a second angle value;

a main board arranged in the case;

a first processing chip arranged on the main board and configured to judge whether an operation mode corresponding to the second angle value is the same as an operation mode corresponding to the first angle value, in response to detecting that the value of the angle between the data processing device and the plane in which the data processing device is placed is adjusted from the first angle value to the second angle value;

a second processing chip arranged on the main board and configured to generate a switching instruction for switching the operation mode in response to determining that the operation mode corresponding to the second angle value is different from the operation mode corresponding to the first angle value; and a third processing chip arranged on the main board and configured to switch the operation mode of the data processing device from the operation mode corresponding to the first angle value to the operation mode corresponding to the second angle value based on the switching instruction, wherein the operation mode corresponding to the second angle value is the first operation mode or the second operation mode; and a fourth processing chip arranged on the main board and configured to generate a display direction control instruction for controlling a change of a display direction in which content is displayed, wherein in the second operation mode, the screen has at least two display areas, and the display direction in which content is displayed in the at least two display areas is changed according to the display direction control instruction, and wherein the display direction control instruction is generated by detecting whether there is a user in a direction and whether to display the content towards the direction, wherein the first processing chip, the second processing chip, the third processing chip and the fourth processing chip are the same chip, or individual chips separately arranged on the main board.

10. The data processing device of claim 9, wherein a first display area of the at least two display areas has a first display content, a second display area of the at least two display areas has a second display content, and a display direction of the first display content is different from that of the second display content.

11. The data processing device of claim 9, characterized in that, the supporting structure cooperates with the rotating structure so that the data processing device keeps in a fixed state at any angle.

12. The data processing device of claim 9, characterized in that, the data processing device further comprises a third operation mode, where the angle between the data processing device and the plane in which the data processing device is placed is within a third angle range, wherein any angle value within the first angle range is larger than any angle value within the third angle range, any angle value within the third angle range is larger than any angle value within the second angle range, and the operation mode corresponding to the second angle value is the first operation mode, the second operation mode, or the third operation mode.

* * * * *